(12) United States Patent
Lavallee et al.

(10) Patent No.: US 7,818,428 B1
(45) Date of Patent: Oct. 19, 2010

(54) METHODS AND APPARATUS FOR NAMING RESOURCES

(75) Inventors: James Edward Lavallee, Boylston, MA (US); Francois Gauvin, Salem, MA (US); Sheldon Lowenthal, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 173 days.

(21) Appl. No.: 12/257,174

(22) Filed: Oct. 23, 2008

Related U.S. Application Data

(63) Continuation of application No. 10/947,063, filed on Sep. 22, 2004, now Pat. No. 7,454,437.

(51) Int. Cl.
 G06F 15/16 (2006.01)
 G06F 15/177 (2006.01)
 G06F 15/173 (2006.01)
 G06F 3/00 (2006.01)
 G06F 13/28 (2006.01)
 G06F 12/00 (2006.01)

(52) U.S. Cl. ............... 709/226; 709/220; 709/223; 709/245; 710/4; 710/9; 710/26; 711/200

(58) Field of Classification Search .......... 709/220, 709/223, 226, 245; 710/4, 9, 26; 711/200
See application file for complete search history.

(56) References Cited

U.S. PATENT DOCUMENTS

| | | | |
|---|---|---|---|
| 6,098,157 A * | 8/2000 | Hsu et al. .................... | 711/157 |
| 6,424,354 B1 | 7/2002 | Matheny et al. | |
| 6,839,746 B1 | 1/2005 | Muthiyan et al. | |
| 7,228,359 B1 * | 6/2007 | Monteiro ..................... | 709/245 |
| 7,353,261 B2 * | 4/2008 | Viswanath et al. .......... | 709/220 |
| 2002/0069105 A1 * | 6/2002 | do Rosario Botelho et al. ........................... | 705/14 |
| 2003/0149763 A1 | 8/2003 | Heitman et al. | |
| 2003/0154271 A1 | 8/2003 | Baldwin et al. | |
| 2003/0167327 A1 | 9/2003 | Baldwin et al. | |
| 2004/0010563 A1 | 1/2004 | Forte et al. | |

(Continued)

OTHER PUBLICATIONS

"Provision of optional edit-display line within table method-having data displayed in cell reflecting same being entered within display-edit line after modification of data" (anonymously assigned, Derwent publication No. RD 257012 issued Sep. 10, 1985, Derwent account No. 1985-254478).

*Primary Examiner*—Saleh Najjar
*Assistant Examiner*—Vitali Korobov
(74) *Attorney, Agent, or Firm*—Chapin IP Law, LLC

(57) ABSTRACT

A software process receives a command initiating creation of a zone naming policy for automatically generating zone names in a storage area network. During creation of a zone naming policy, the software process receives selection of one or more format elements to be used in the zone naming policy. The one or more format elements each identify which corresponding at least one type of characteristic associated with a given zone in the storage area network shall be used to automatically generate a respective zone name for the given zone. For example, the format elements in a zone policy may identify how to generate a respective zone name using identifiers associated with resources associated with the zone. Accordingly, a network manager can create a zone naming policy for automatically generating zone names in a storage area network rather than having to manually create zone names for each created zone.

15 Claims, 12 Drawing Sheets

U.S. PATENT DOCUMENTS

2004/0193739 A1* 9/2004 Shimizu et al. ............... 710/1
2005/0114476 A1 5/2005 Chen et al.
2005/0197101 A1* 9/2005 Gupta ...................... 455/410

* cited by examiner

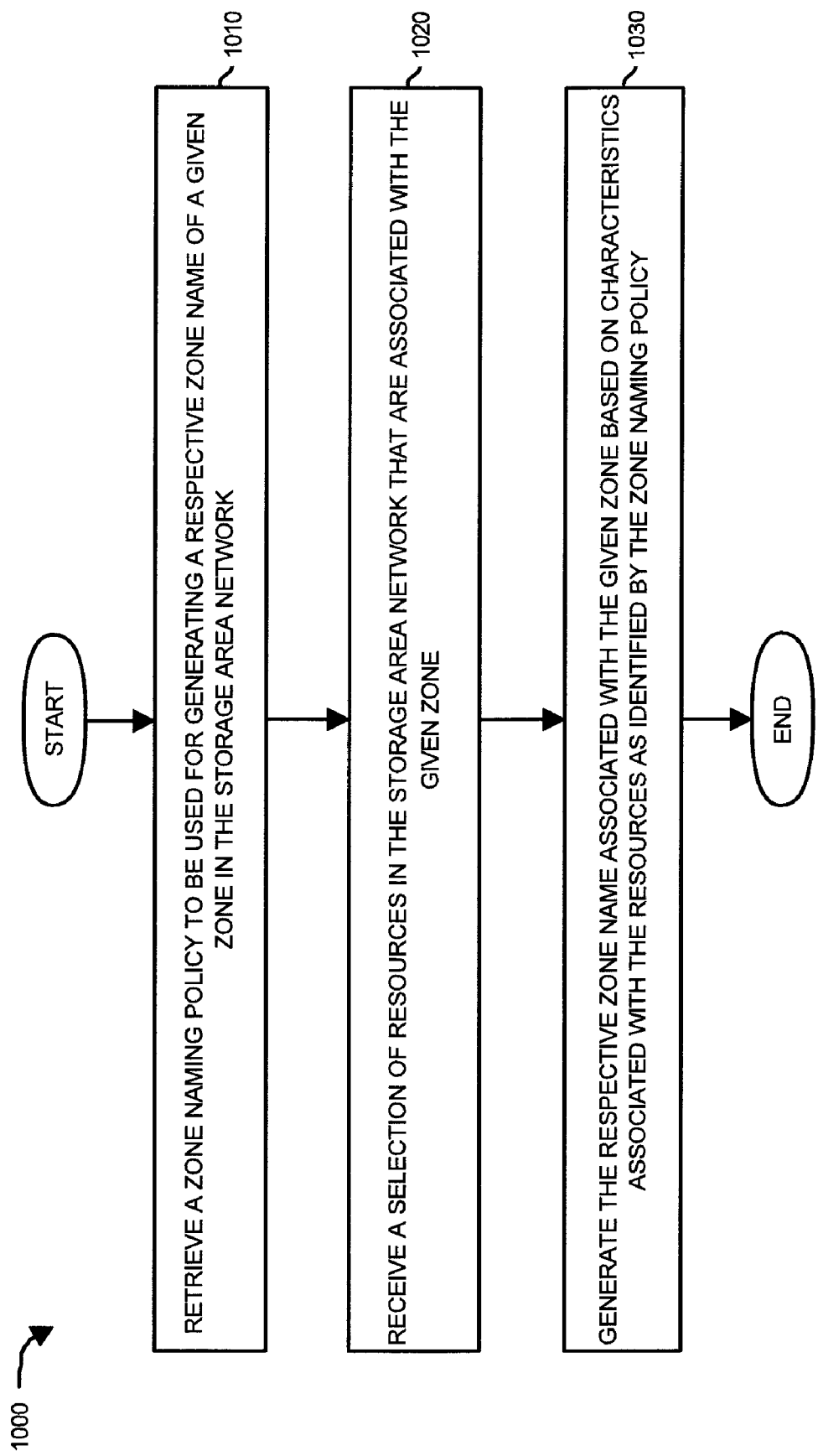

METHODS AND APPARATUS FOR NAMING RESOURCES

RELATED APPLICATION

This application is a continuation of and therefore claims priority to earlier filed U.S. patent application Ser. No. 10/947,063 entitled "METHODS AND APPARATUS FOR NAMING RESOURCES," filed on Sep. 22, 2004 now U.S. Pat. No. 7,454,437, the entire teachings of which are incorporated herein by this reference.

BACKGROUND

The rapid expansion of information service and data processing industries has resulted in a need for computer systems to manage and store large amounts of data. As an example, financial service companies such as banks, mutual fund companies or the like often operate complex data processing systems that require access to many hundreds of gigabytes or even terabytes of data and files stored within high capacity data storage systems. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems on behalf of client computers that request data from the servers. Typically, storage area networks support hi-speed acquisitions of data so that the host servers are able to promptly retrieve and store data from the data storage system.

Conventional storage area network management applications provide conventional graphical user interfaces (GUIs) that enable network managers to graphically manage, control and configure various types of hardware and software resources associated with a corresponding managed storage area network. For example, one conventional network management storage application generates a graphical user interface utilized by a network manager to graphically select, interact with, and manage local or remote devices and associated software processes associated with the storage area network. More specifically, based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. In some storage area networks, a network management station and associated management software allows a network administrator or systems manager (a person responsible for managing the storage network) to establish "zones" of related resources within the storage network.

Generally, a zone of resources within a storage network is an association, relation or grouping of resources (e.g., servers, switch channels, portions of data storage) that are arranged according to function or location. By way of example, a network administrator can use conventional vendor-supplied (i.e., manufacturer supplied) storage network management software to configure a zone of ports (data communications channels or paths) within that vendor's data switch to associate certain servers in the data storage network with certain allocations of data storage within one or more of the data storage systems in the data storage network. Thus, the network administrator might, for example, define a zone to include a server or group of servers, a dedicated channel through the data switch (via allocation of one or more ports), and an amount of data storage space in the form of one or more volumes of storage maintained within one or more of the data storage systems. An administrator might create such a zone or many zones in the storage network, for example, for each department (e.g., engineering, accounting, human resources, and the like) within a company.

A data switch (one or more) that channels requests for data between the various data storage devices and server computer systems is generally responsible for zone enforcement. In operation of a typical data switch, each port within the data switch is dedicated to transferring data to and/or from a single respective data storage system or server computer system. To create a zone, the management software causes the data switch to establish a grouping of one or more server ports (i.e., connections between the data switch and a server) with one or more data storage system ports (i.e., connections between the data switch and a data storage system) together into a zone. Generally, resources (servers, switch ports, and portions of data storage systems) within the same zone can "see" or access each other, while resources in different zones cannot access each other. As an example, a server in a first zone can access data storage in the first zone, but not data storage allocated to other zones. Thus, zoning in the context of storage networks operates as a form of access control and provides an organized mechanism of managing and associating amounts of data storage to specific computer systems.

Typically, a network administrator creates a zone of servers and associated storage resources for an intended purpose. For example, an administrator might place accounting servers and accounting data into an accounting zone, while engineering servers and engineering data storage resources might be placed into an engineering zone.

SUMMARY

Conventional network management applications that support management of network resources such as zones suffer from a variety of deficiencies. For example, certain conventional network management applications enable a network manager to create zones associated with a storage area network. However, a network administrator must manually generate corresponding zone names as the zones are created. The process of manually generating zone names is quite tedious, especially when the network manager creates thousands of zones for the storage area network. In addition to being time consuming, manually generating zone names is prone to error and often results in inconsistent zone names.

Embodiments of the invention significantly overcome the aforementioned and other deficiencies of conventional network management applications. In particular, embodiments of the invention include mechanisms and techniques for managing network resources in such a way as to reduce the effort required by a network manager to create and, in general, manage zone names associated with a storage area network.

For example, in contradistinction to conventional techniques, embodiments of the invention allow a network manager to create zone naming policies (e.g., blueprints indicating how to generate a zone name) to be used for automatically generating zone names associated with a storage area network. Automatic generation of zone names via a machine (e.g., a computer processing device or software code) reduces an amount of errors that may otherwise occur during manual creation of the zone names via a human operator. As discussed, conventional techniques require that a user manually type a zone name to be associated with a zone and are thus prone to typing errors. Automatic generation of zone names according to an embodiment of the invention is less prone to error such as typing errors by a user creating names for each zone because zone names are created automatically based on a specific zone naming policy. In addition to fewer errors, automatic generation of zone names for a storage area network reduces network management overhead because the network administrator need not manually create each zone name from scratch.

In one embodiment, a single zone naming policy can be used to generate multiple zone names associated with a storage area network. Use of a single zone naming policy ensures consistency among the generated zone names because the zone names are created based on a common blueprint. The generated zone names are easily viewed in a table or hierarchy because they are based on a common zone naming policy rather than a random naming process.

The computer device supporting creation of zone naming policies and generation of zone names using the zone naming policies may be, for example, a network management workstation including a network management software application (e.g., a resource manager) that presents, during runtime, a graphical user interface to a corresponding network manager. Typically, a network manager provides input to the graphical user interface to perform different management operations such as providing format information to be used associated with a particular zone naming policy. The network manager also provides input to a graphical user interface to employ a zone naming policy for purposes of automatically generating zone names. Certain embodiments of the invention extend to network management software incorporating the functionality explained herein, as well as computerized devices configured to operate as explained herein.

More specifically, an embodiment of the invention includes a network management software application (running on a network management computer station) that enables a network manager to receive a command from a user initiating display of an editor for editing a zone naming policy associated with the storage area network. The editor (e.g., a pop-up window) accepts information to be associated with a zone naming policy created by the network manager or user. For example, in one embodiment, the editor provides a data field for receiving an identifier to be used for identifying the zone naming policy.

Based on input from the network manager, the editor further receives selection of a zone type to be associated with the zone naming policy. In one embodiment, the zone type is one of: end port zoning and switch port zoning.

Based on yet further input from the network manager, the editor receives selection of a format element to be included in the zone naming policy. The format element identifies a type of identifier to be used in creating zone names. For example, the format element may identify that names or identifiers of: i) a host resource ii) a switch resource, and/or iii) a storage resource associated with a respective zone of the storage area network shall be used when generating a zone name. Thus, a zone name may include a string, or strings, of text identifying named resources associated with the path between a source (e.g., host) and target (e.g., storage array).

In one embodiment, in addition to the format element, the editor receives selection of a qualifier associated with the format element. A combination of the qualifier and format element provide a blueprint or format for generating the zone names.

The network manager utilizes the zone naming policy to generate zone names associated with respective zones of the storage area network. In one embodiment, the generated zone names at least partially identify resources associated with respective zones in the storage area network. For example, as discussed, the format element associated with a zone naming policy may indicate that a name associated with a host, switch, and/or a storage resource associated with a zone shall be used to generate a zone name. Thus, in one embodiment, automatically generated zone names include strings of text describing resources such as a host, switch, and or a storage system in a path or partial path associated with a respective zone.

Now, more generally, embodiments of the invention therefore include a technique of utilizing a processing device (or processing code) to create a zone naming policy for automatically generating zone names. In one embodiment, the processing device receives a command initiating creation of a zone naming policy for generating zone names in the storage area network. Additionally, the processing device receives selection of one or more format elements to be used in the zone naming policy. The one or more format elements each identify which corresponding at least one type of characteristic associated with a given zone in the storage area network shall be used to automatically generate a respective zone name for the given zone. The processing device stores the zone naming policy for later use. Based on this technique, a network manager can specify a format in a zone naming policy for creating zone names, reducing an overall effort required to generate zone names.

In further more specific embodiments, in response to receiving a command from a user, the processing device displays an editor (e.g., graphical user interface). The editor enables modification of a zone naming policy associated with the storage area network.

In one embodiment, the editor providing a list of acceptable format elements for potential use in the zone naming policy. Additionally, the editor displays a zone name format field (e.g., a window that accepts a text string) to receive the selection of the at least one format element to be used in the zone naming policy.

To edit or modify a name associated with a zone naming policy, the editor displays a zone naming policy data field for the user to provide a text string to be used for identifying the zone naming policy. Thus, the editor enables a user to rename and modify an existing zone naming policy or create and name a new policy from scratch.

In one embodiment, the editor further displays selectable options identifying a zoning type to be associated with the zone naming policy. The selectable options include an end port zoning option and a switch port zoning option.

As previously discussed, in one embodiment, the processing device (via the editor) receives a command initiating creation of a zone naming policy for generating zone names in the storage area network. Thereafter, the processing device receives selection of one or more format elements to be used in the zone naming policy. Each format element identifies which corresponding type of characteristic (e.g., resource name, time, custom label, etc.) associated with a given zone in the storage area network shall be used to automatically generate a respective zone name for the given zone. For example, as mentioned, a characteristic may be a time when a zone is created. Each format element may further identify which corresponding type of resource and corresponding type of resource name associated with the given zone shall be used to automatically generate the respective zone name. For example, a characteristic may be, as discussed, a resource name such as a host resource name, switch resource name, etc.

In one embodiment, the processing device receives selection of one or more qualifiers to be used in the zone naming policy. The one or more qualifiers are used in conjunction with a specified one or more format identifiers to generate the respective zone name. For example, each qualifier can be used to modify how a data string as specified by a respective format element shall be used to generate a zone name when implementing the respective zone naming policy. More specifically, the format identifier may indicate that the name of a switch in the storage area network shall be used when generating zone names. A qualifier can indicate which portion (such as the first three letters) of the resource name shall be used when automatically generating zone names based on the respective zone naming policy.

As discussed, a zone naming policy can be used to generate zone names for a group of zones associated with a storage area network. Thus, based on use of a common zone naming policy, the group of zones will have a consistent rather than a random naming convention.

In another embodiment, during automatic generation of zone names, the processing device receives a selection of ports (e.g., resources) in the storage area network that are to be associated with a given zone. The processing device identifies resources (e.g., a host computer, switch, or storage system) in the storage area network to which the ports are attached. The ports can be associated with resources such as i) a host resource, ii) a switch resource, and iii) a storage array resource, etc. Based on identifiers associated with the resources to which the ports are attached and the selection of the at least one format element associated with a given zone naming policy, the processing device generates respective zone names associated with zones of the storage area network. As discussed, format elements in a zone naming policy can include corresponding qualifiers further refining how a zone name shall be generated for a respective zone in the storage area network.

In yet another embodiment, a graphical user supporting management of the zones of a storage area network enables a user to select multiple previously created zone naming policies. Based on selection of the zone naming policies associated with a storage area network, the processing device provides a table (e.g., on a computer display screen) of zoning naming policies with corresponding information identifying how to create zone names for each policy. The processing device populates the table with zone naming policy information associated with selected zone naming policies for simultaneous viewing by the user. In a further embodiment, the graphical user interface further enables the user to select and modify attributes of zone naming policy displayed in the table.

As briefly discussed, another general embodiment of the invention is directed towards automatically generating zone names based on a zone naming policy. For example, in one embodiment, a processing device retrieves a zone naming policy to be used for generating a respective zone name of a given zone in the storage area network. In addition the processing device, receives a selection (e.g., from a network administrator) of resources in the storage area network that are associated with the given zone. The processing device generates the respective zone name associated with the given zone based on characteristics associated with the resources as identified by the zone naming policy.

In a more particular embodiment of generating zone names, the processing device receives identification (e.g., from a network manager) of a specific zone naming policy to be used for generating respective zone names in zones of the storage area network. Based on the identification, the processing device retrieves the zone naming policy to be used for generating zone names. Retrieving the zone naming policy involves retrieving a format element (or format elements) associated with the zone naming policy. As discussed, the format element identifies which identifiers associated with the corresponding resources of the zone shall be used to generate respective zone names.

In addition to identification of the zone naming policy, the processing device also receives a selection of resources (e.g., ports) in the storage area network that are associated with a given zone. For example, a network administrator may identify that certain ports of a switch are associated with a given zone in the storage area network. Based on the selection of resources associated with a zone, the processing device identifies corresponding resources in the storage area network to which the ports are attached. Based on identifiers associated with the corresponding resources as identified by the zone naming policy, the processing device generates the respective zone name associated with the given zone.

Resources (e.g., ports) associated with a zone may change. As a result of such an event, a previously generated zone name associated with the zone may not properly reflect the zone. Thus, in one embodiment, the processing device generating zone names receives a change to the selection of resources that are associated with a given zone. Based on the change, the processing device modifies the respective zone name to a different zone name in accordance with a specified format identified by the zone naming policy.

In one embodiment, the processing device generating zone names generates multiple zone names based on use of a single zone naming policy. To avoid generating two identical zone names, the processing device checks whether a newly generated zone would be identical to another existing zone name in the storage area network. In the event that the processing device identifies that a newly generated zone name would be identical to an existing zone name, the processing device modifies the newly generated zone name to be unique with respect to the existing zone name. For example, the processing device includes a character or string of characters to a zone distinguishing the newly created zone name from the existing zone name. This prevents generation of two identical zone names.

As discussed, techniques of the invention are well suited for use in applications in which a network manager manages generation of zone names for corresponding zones in a storage area network. However, it should be noted that embodiments of the invention are not limited to use in such applications and thus embodiments of the invention are well suited for other applications as well. For example, techniques described herein can be used to automatically generate names associated with VSANs (Virtual Storage Area Networks).

Other embodiments of the invention include a computerized device (e.g., a host computer, workstation, etc.) configured to support the aforementioned method operations disclosed herein as embodiments of the invention to create zone naming policies. In such embodiments, the computerized device includes a display, a memory system, a processor (e.g., a processing device) and an interconnect. The interconnect supports communications among the display, the processor and the memory system. The memory system is encoded with a resource management application that, when executed on the processor, produces a resource management process that includes a graphical user interface produced on the display of the computerized device. The graphical user interface allows the resource management process to perform any of the method embodiments and operations explained herein. For example, the resource management process generates an editor enabling a network manager to create, edit, modify, etc. zone naming policies for automatically generating zone names associated with a storage area network.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support generation of zone naming policies and zone names as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One more particular embodiment of the invention is directed to a computer program product that includes a computer readable medium having instructions stored thereon for supporting management of network resources. The instructions, when carried out by a processor of a respective computer device, cause the processor to perform the steps of: i) receiving a command initiating creation of a zone naming policy for generating zone names in the storage area network; ii) receiving selection of at least one format element to be used in the zone naming policy, the at least one format element identifying which corresponding at least one type of characteristic associated with a given zone in the storage area network shall be used to automatically generate a respective zone name for the given zone; and iii) storing the zone naming policy. Other embodiments of the invention include software programs to perform any of the method embodiment steps and operations summarized above and disclosed in detail below.

It should be understood that the system of the invention can be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 10 is a flowchart illustrating a general technique of utilizing a zone name policy to automatically generate zone names according to an embodiment of the invention.

DETAILED DESCRIPTION OF PREFERRED EMBODIMENTS

An embodiment of the invention is directed to a technique of creating and utilizing zone naming policies. For example, a software process receives a command initiating creation of a zone naming policy for automatically generating zone names in a storage area network. During creation of a zone naming policy, the software process receives selection of one or more format elements to be used in the zone naming policy. The one or more format elements each identify which corresponding at least one type of characteristic associated with a given zone in the storage area network shall be used to automatically generate a respective zone name for the given zone. For example, the format elements in a zone policy may identify how to generate a respective zone name using identifiers (e.g., a name) associated with resources (e.g., a host, switch, or storage entity) in or associated with the zone. Accordingly, a network manager can create a zone naming policy for automatically generating zone names in a storage area network rather than having to manually create zone names for each created zone. One purpose of supporting zone naming policies is to ensure consistency among zones created for similar purposes or for use by a particular group type such as a marketing group, engineering group, accounting group, etc. who utilizes shared storage. Consistently named zones can be more quickly reviewed and analyzed by a network manager when the zone names are displayed in tabular form.

Figure 1:
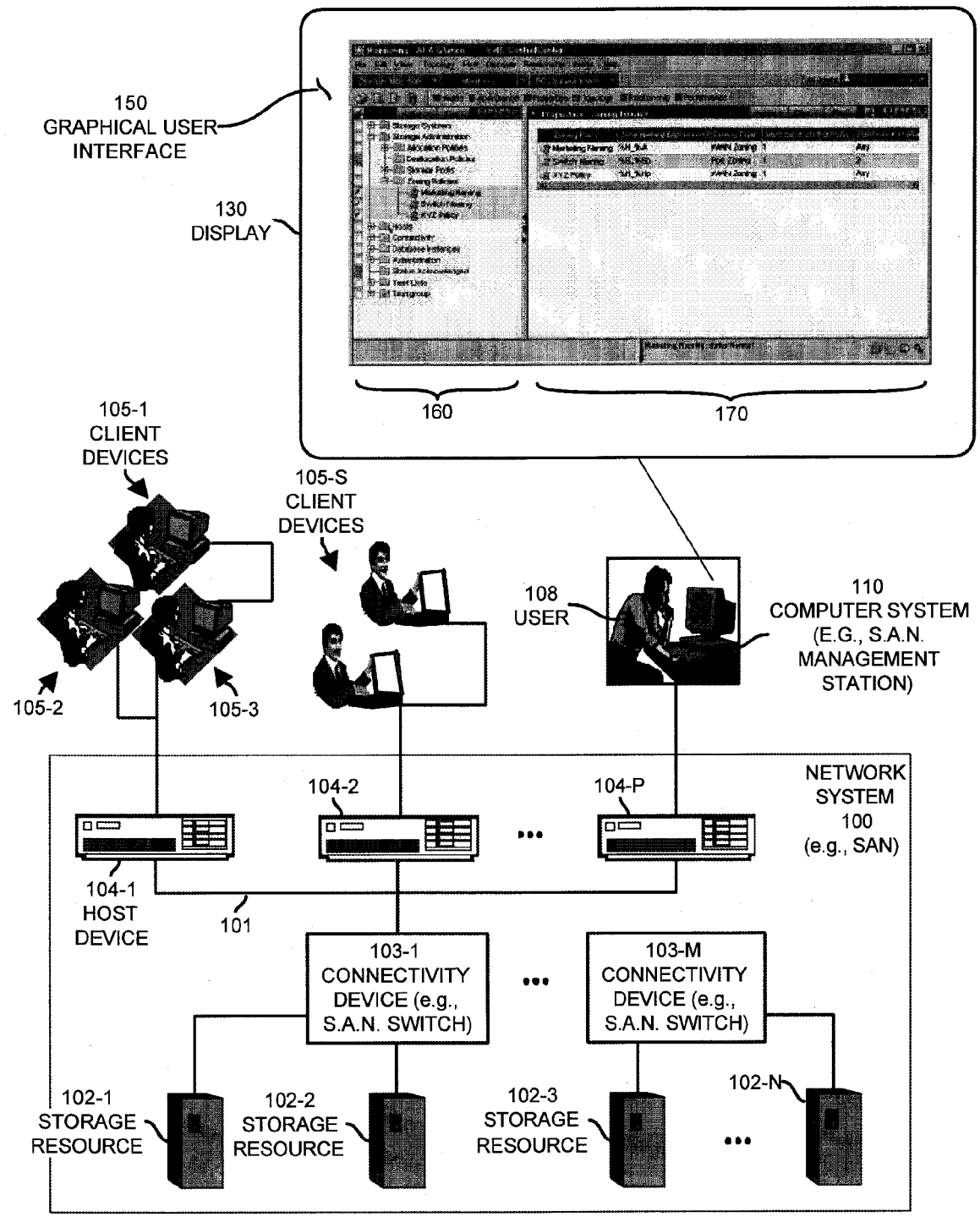
FIG. 1 is a block diagram of a storage area network and management station configured to generate and utilize zone naming policies according to an embodiment of the invention.

FIG. 1 illustrates a network system 100 (e.g., a storage area network) suitable for use in explaining an operation of example embodiments of the invention. As shown, the network system 100 includes a network medium 101 such as a high-speed data communications medium (e.g., Ethernet, optical network, or other type of network) that interconnects a plurality of components such as storage resources 102-1, 102-2, . . . 102-N, network switches 103-1 (e.g., SAN switches), . . . , 103-M, host devices (e.g., host servers) 104-1, 104-2, . . . , 104-P, client devices 105-1, 105-2, . . . , 105-S, and computer system 110 (e.g., a storage area network management station).

Computer system 110 is configured, in this example, as a storage area network management station operated by network manager or user 108 (e.g., a user responsible for managing the resources within the storage area network 100). Computer system 110 executes a resource manager application 120 (e.g., a software graphical user interface application more particularly shown in FIG. 2) that generates and displays information in accordance with embodiments of the invention as will be explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a monitor or other visual display device) which resource manager 120 controls to display a graphical user interface 150 as explained herein. User 108 provides input commands to control what information (e.g., tables, pop-up screens, etc.) is displayed on display 130.

The graphical user interface 150 configured in accordance with embodiments of the invention includes a hierarchical arrangement of icons 160 (e.g., a hierarchy of vertically disposed icons of resources associated with a storage are a network) and display region 170. Display region 170 includes a table of zone naming policy information associated with network system 100. In general, icons illustrated on display 130 represent managed hardware and software entities associated with network 100. As will be explained in more detail shortly, the graphical user interface 150 enables a user 108 of the computer system 110 to select one or more icons (e.g., host resources) from the hierarchical arrangement of icons 160 displayed on the left side of display 130 and display zone naming policy information including information how to automatically generate zone names associated with network 100 (e.g., storage area network).

Figure 2:
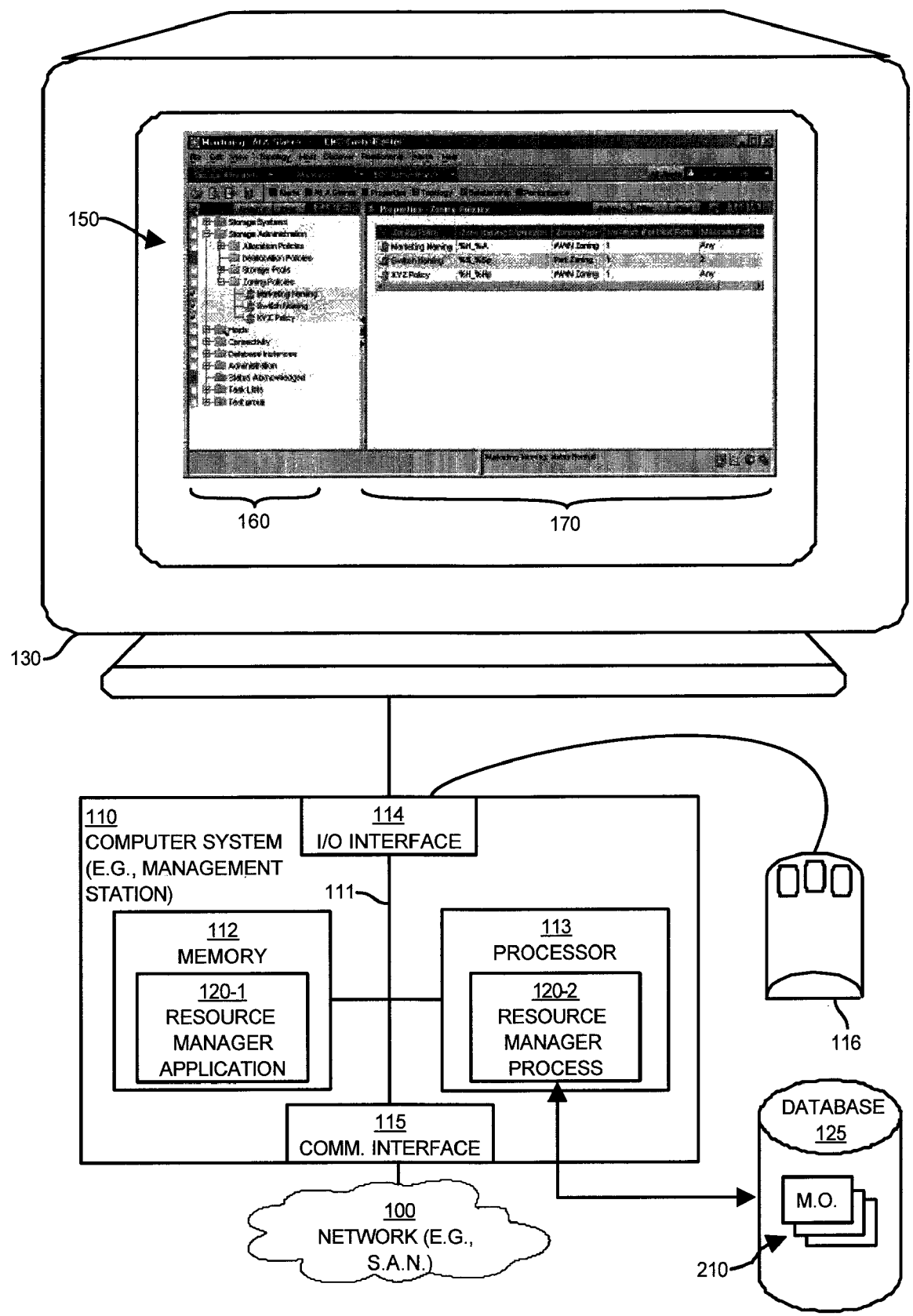
FIG. 2 is a block diagram of a processing device suited for executing techniques according to an embodiment of the invention

FIG. 2 is a block diagram illustrating an example architecture of computer system 110 (e.g., a storage area network management station) according to embodiments of the invention. Computer system 110 may be a computerized device such as a personal computer, workstation, portable computing device, console, network terminal or the like.

As shown, computer system 110 of the present example includes an interconnect 111 that couples a memory 112, a processor 113, an input/output interface 114 and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150. Database 125 stores managed objects 210 associated with managed entities (e.g., hardware and software entities associated with host devices 104, storage resources 102, etc.) in network system 100. Communications interface 115 enables computer system 110 (and corresponding user 108) to communicate with other devices (i.e., resources) associated with network 100.

As shown, memory 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing or supporting the various steps and functional operations to carry out the features of embodiments of the invention.

It should also be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Display 130 need not be coupled directly to computer system 100. For example, the resource manager 120 can be executed on a remotely accessible computerized device. In this instance, the graphical user interface 150 may be displayed locally to the user, while the resource manager process 120 is executed remotely.

To generate displayed information in graphical user interface 150, the host computer system 110 (e.g., the resource manager process 120-2) extracts information from database 125. For example, in one embodiment, the resource manager 120 receives an identity of at least one selected network resource (e.g., VSAN) associated with the storage area network. Based on the selected network resource, the resource manager 120 extracts information associated with the managed objects 210 associated with the selected network resource as well as other related managed objects 210 from management database 125.

As mentioned, graphical user interface 150 generated by resource manager 120 provides user 108 an ability, among other things, to display zone naming policy information.

Again, the resource manager 120 utilizes the zone naming policy information to automatically generate zone names associated network 100.

In one embodiment, computer system 110 extracts information from database 125 using SQL (Structured Query Language) and stores the information in data structures for processing. For example, database 125 contains managed objects 210 (e.g., database records, tables, data structures, etc.) associated with various hardware and software entities associated with network system 100. In one embodiment, database 125 includes managed objects 210 corresponding to network resources in network system 100. More details regarding use of managed objects 210 will be discussed in connection with FIG. 3.

Figure 3:
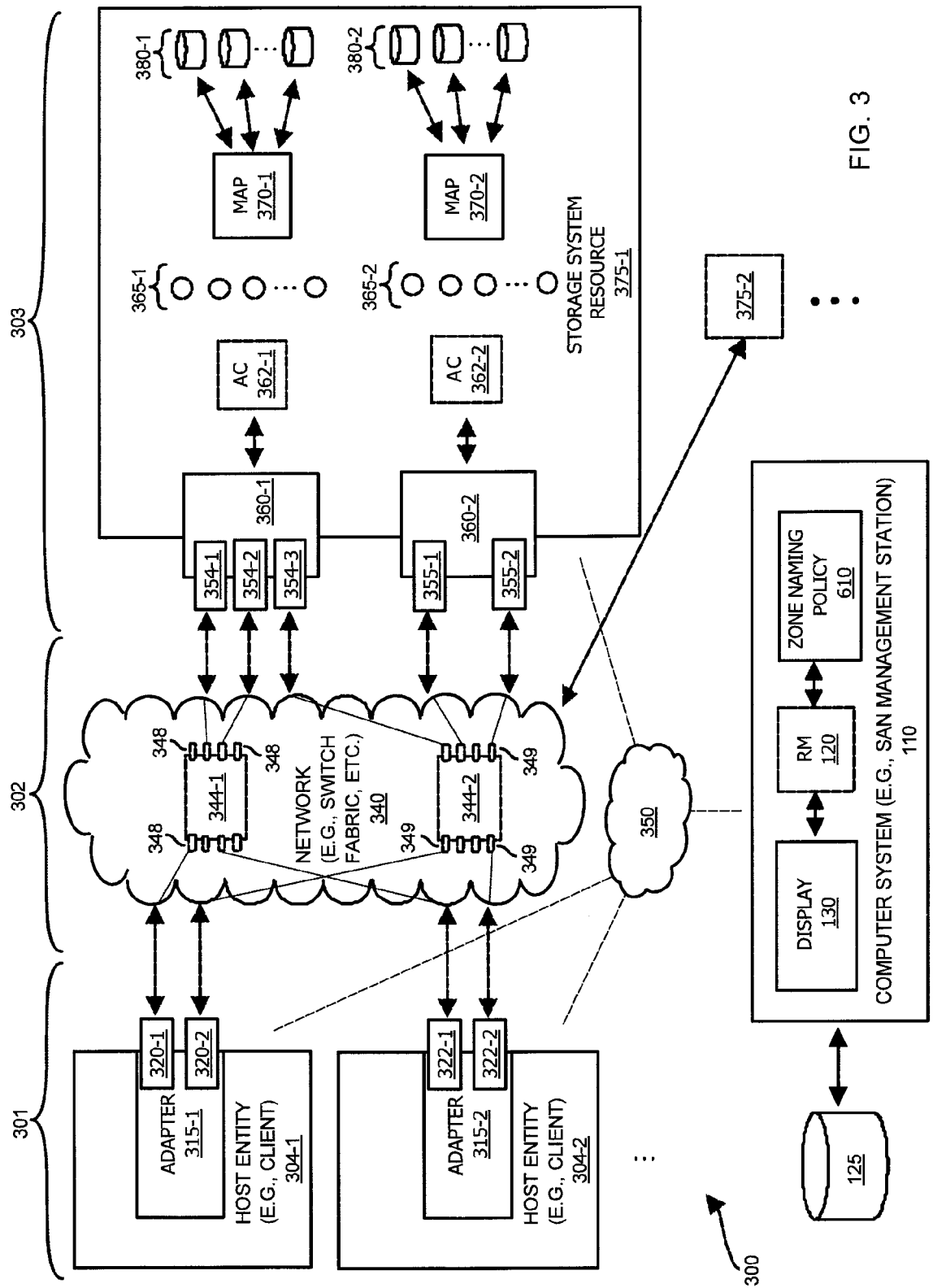
FIG. 3 is a block diagram illustrating a relationship between host resources, switch resources, and storage resources according to an embodiment of the invention.

FIG. 3 is a block diagram illustrating connectivity of network resources (e.g., host resources 301, switch resources 302, and storage resources 303) in a storage area network 300 according to an embodiment of the invention. As shown, storage area network 300 includes host entity 304-1 and host entity 304-2 (collectively, host entities 304), network 340 (e.g., a high speed fiber based switch fabric), network 350 (e.g., LAN, WAN, Internet, intranet, etc.), storage system resource 375-1, storage system resource 375-2, computer system 110, and database 125. Network 340 includes switch device 344-1, switch device 344-2 and corresponding switch ports 348 and 349. Host entity 304-1 includes adapter 315-1 and corresponding port 320-1 and port 320-2 to communicate over network 340. Host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, storage area network 300 enables host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 is limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone defines a group of resources in the network providing a logical path between a host resource and a storage array resource. Thus, in some respects, a zone is a definition of a logical path in the network 300. A user 108 creating and modifying the zones may give them names for management purposes. As will be discussed in more detail, the resource manager 120 generates zone names automatically based on a selection of resource associated with a zone and a corresponding selected zone naming policy 610. This is discussed in more detail in the following text and related figures.

Figure 4:
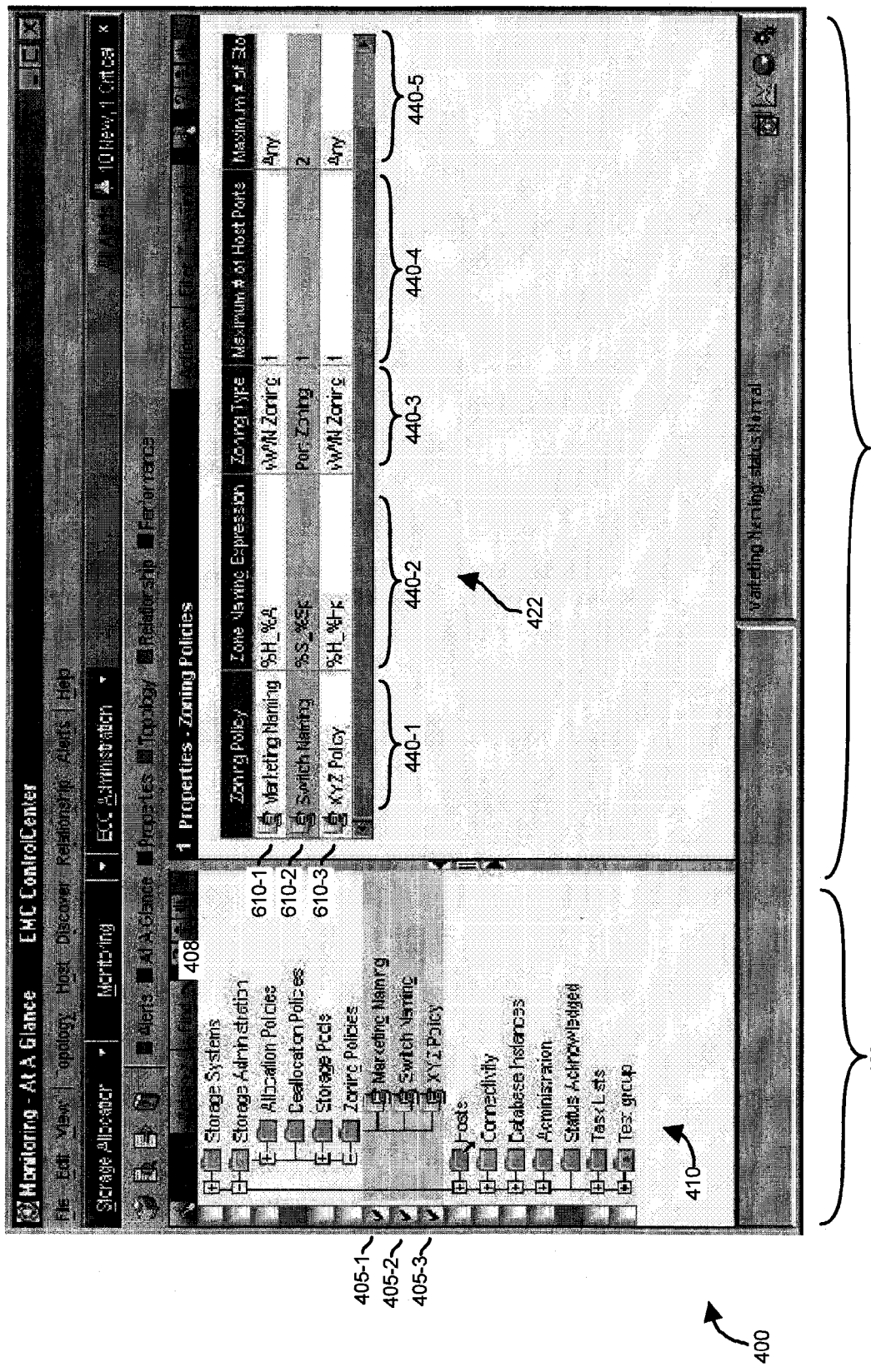
FIG. 4 is a screenshot of a graphical user interface according to an embodiment of the invention.

FIG. 4 is a screenshot 400 on display 130 according to an embodiment of the invention. As shown, display region 160 of screenshot 400 includes hierarchy of icons 410 representing managed objects (e.g., hardware and/or software resources) associated with storage area network 300. User 108 clicks on corresponding icons (sending commands to resource manager 120) to expand or minimize different folders and view resources and sub-resources associated with network 100 and 300.

Display region 160 includes display regions 405 (e.g., display region 405-1, 405-2, 405-3, 405-4, . . . 405-n), which may be toggled (e.g., via user 108 clicking on them) to identify network resources selected by user 108. Network resources selected by user 108 are highlighted via a checkmark in display regions 405. As shown, user 108 clicks on display region 405-1, 405-2 and 405-3 to select zoning policies "Marketing Naming" 610-1, "Switch Naming" 610-2, and "XYZ Policy" 610-3 for viewing corresponding zone policy information in table 422 in display region 170.

Table 422 includes columns and rows of zone policy information. For example, column 440-1 includes names of zone policies selected from hierarchy 410. Column 440-2 includes a format associated with a respective zone policy indicating how to create respective zone names. Column 440-3 identifies a zone type (e.g., WWN zoning or Port zoning) associated with respective zone policies. Column 440-4 identifies a maximum number of host ports associated with a respective zone policy. Column 440-5 identifies a maximum number of storage ports associated with a respective zone policy.

To edit an existing zone policy or create a new zone policy, user 108 provides a command to resource manager 120. In one embodiment, to provide the command, user 108 right clicks on a computer mouse to select a zone policy in table 422 for editing or create a new zone policy altogether. In response to receiving such a command, resource manager 120 generates the pop-up window shown in FIG. 5.

Figure 5:
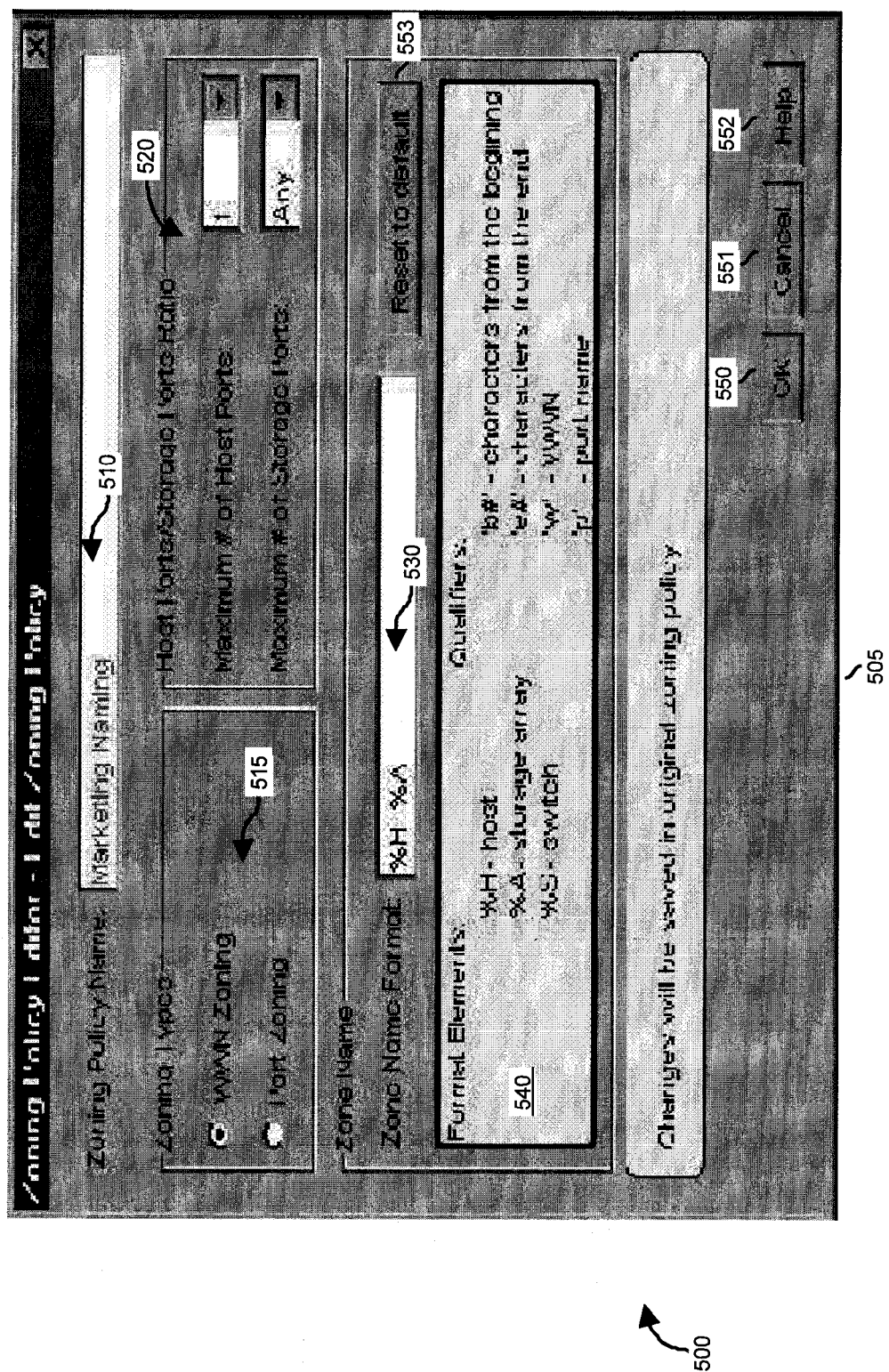
FIG. 5 is a screenshot of a graphical user interface according to an embodiment of the invention.

FIG. 5 is a screenshot 500 illustrating a pop-up window for creating, modifying and editing a zoning policy according to an embodiment of the invention. As shown, resource manager 120 provides a zoning policy name data field 510 in editor 505 so that user 108 can name or rename a zone naming policy by typing in appropriate characters.

Selection region 515 in edition 505 enables user 108 to select a zoning type associated with a respective zone naming policy. In the example shown, "WWN Zoning" (e.g., end port zoning) has been selected in lieu of "Port Zoning" (e.g., switch port zoning). This selection can be toggled.

Selection region 520 enables user 108 to select a maximum number of host ports and a maximum number of storage ports associated with a respective zone naming policy.

Zone name format data field 530 in editor 505 enables user 108 to select format elements and qualifiers to be associated with the respective zone naming policy. After modifying attributes associated with the respective zone naming policy via editor 505, user 108 accepts the changes by clicking on icon 550. Thereafter, the resource manager 120 closes the editor 505 and stores the created or modified zone naming policy for later use by user 108. As discussed above, the zone naming policy appears in hierarchy 410 and is selectable for i) generating zone names and ii) appearing in table 422 for viewing by user 108.

In addition to icon 550, editor 505 includes "Reset to Default" icon 553, "Cancel" icon 551, and "Help" icon 552. User 108 clicks on "Reset to Default" icon 553 to reset a zone name format in data field 530 to %H_%Hp. This zone naming format is discussed later in FIG. 7. User 108 clicks on "Cancel" icon 551 to cancel all changes and close the editor 505. User 108 clicks on "Help" icon 552 to open relevant help topics.

In general, the above-mentioned format elements and qualifiers associated with a respective zone naming policy indicate a format how to automatically generate zone names for network 300. A technique of generating zone names based on use of a zone naming policy is more particularly shown in FIG. 6 and FIG. 7.

Figure 6:
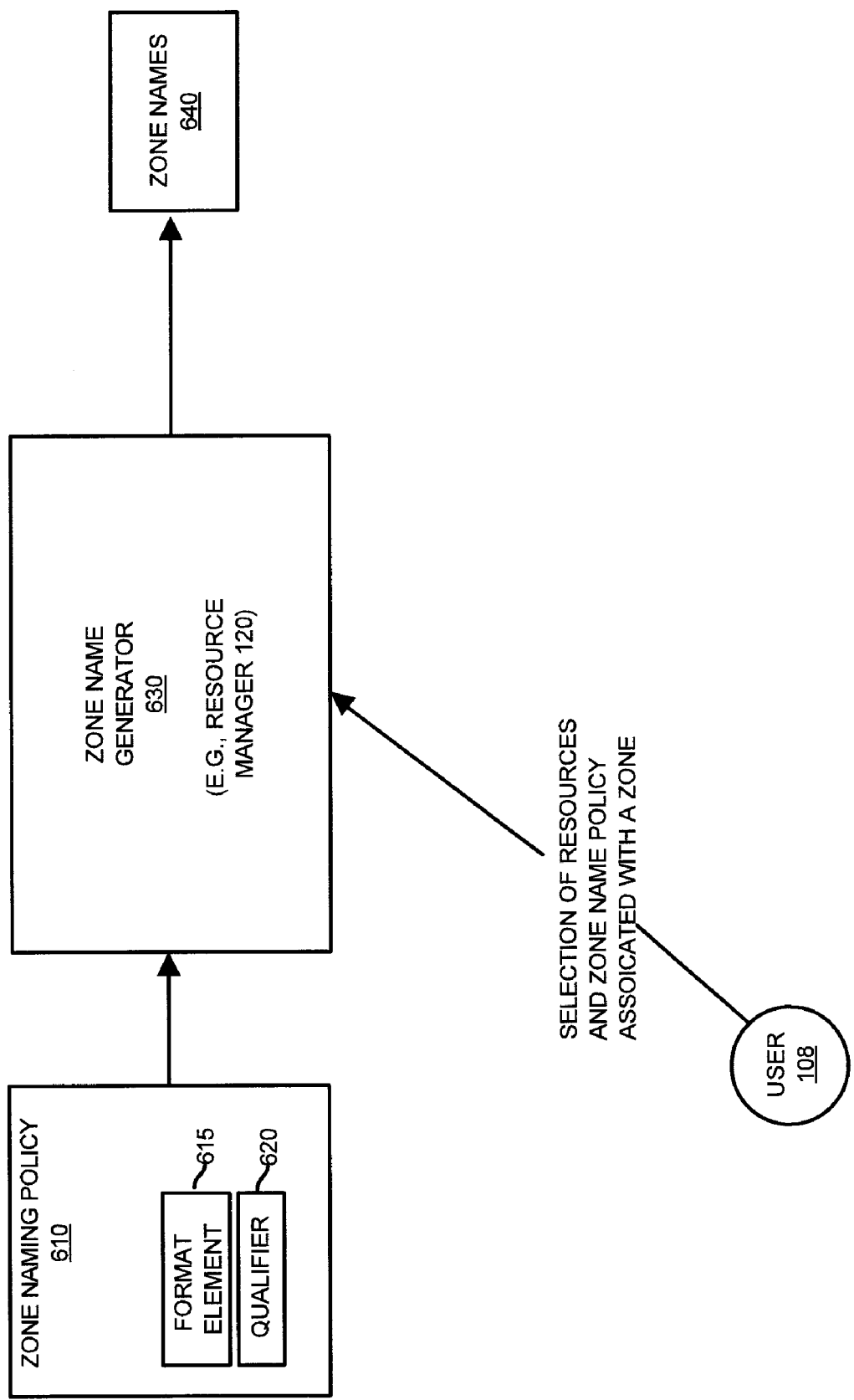
FIG. 6 is a diagram of a zone name generator according to an embodiment of the invention.

FIG. 6 is a block diagram illustrating a technique of generating zone names 640 based on input from user 108. As shown, to utilize a zone naming policy 610 for automatically generating zone names 640, user 108 provides a selection of zone resources and a respective zone naming policy 610 to zone name generator 630 (e.g., resource manager 120) for automatic generation of zone names 640. Based on selection of the respective zone naming policy 610, the zone name generator 630 retrieves the format elements 615 and qualifiers 620, if any, to be used for generating the one or more zone names 640. Examples of generating zone names 640 based on format elements 615 and qualifier 620 is shown in FIG. 7.

Figure 7:
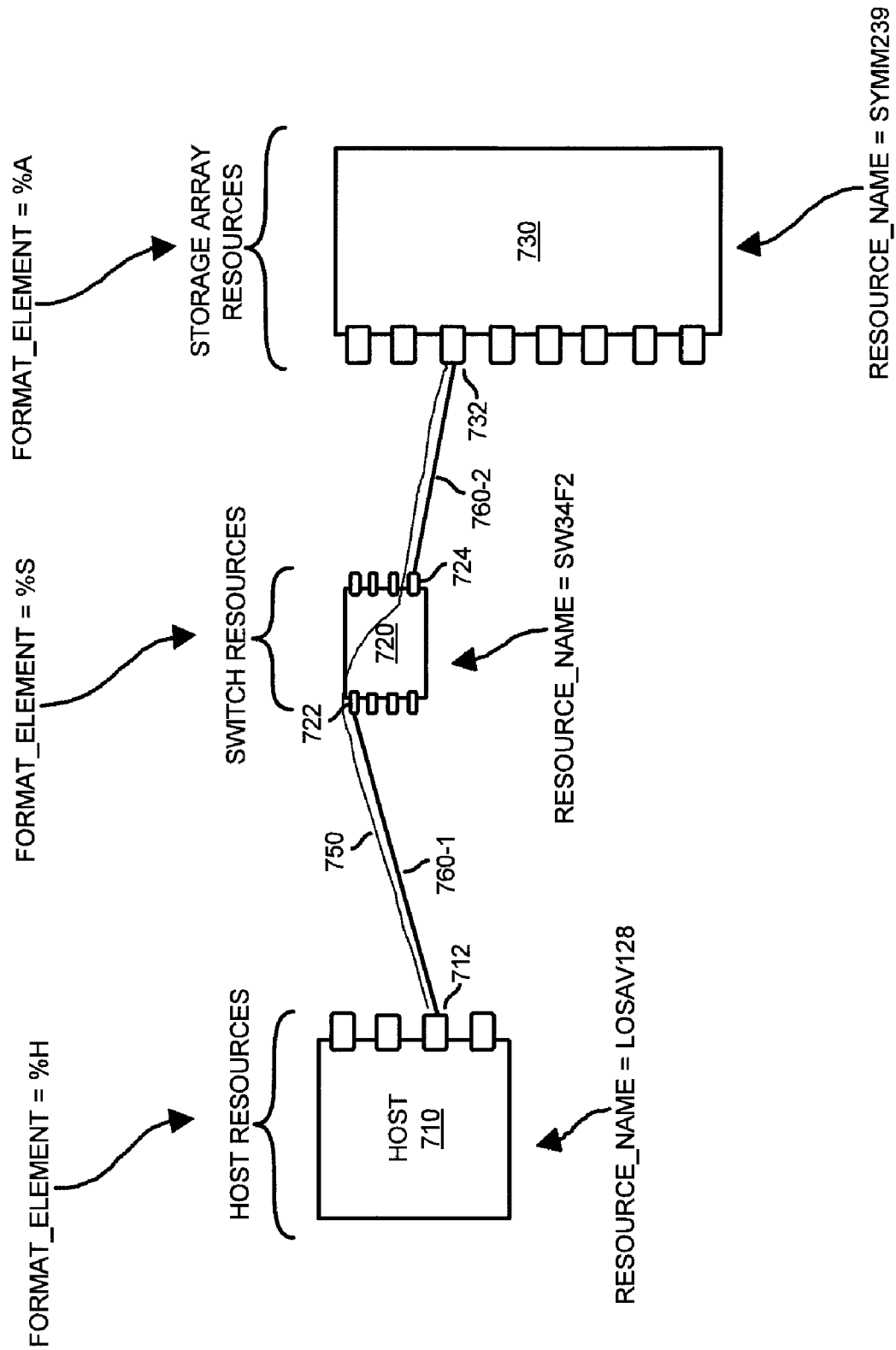
FIG. 7 is a diagram illustrating identifiers associated with resources in a zone and generation of a zone name according to an embodiment of the invention.

FIG. 7 is a diagram illustrating an example zone 750 according to an embodiment of the invention. As shown, zone 750 defines a logical path between host 710 and storage array resource 730 through switch resource 720. More particularly, zone 750 comprises a logical path from port 712 of host resource 710 through link 760-1 (e.g., a fiber channel link) to port 722 of switch resource 720. Further, zone 750 comprises a logical path from port 724 of switch 720 through link 760-2 to port 732 of storage array resource 730. Note that each resource shown in FIG. 6 has an associated identifier. For example, host resource 710 has a name of "LOSAV128." Switch resource 720 has a resource name of "SW34F2." Storage array resource 730 has a resource name of "SYMM239."

As previously discussed, a zone naming policy 610 identifies how to create zone names for a particular zone. The zone naming policy 610 can include format elements such as %H, %S, and %A. Format element %H (when included in a zone naming policy) indicates to use a resource identifier associated with host resource 710 of the zone 750 when automatically creating a respective zone name. Format element %S (when included in a zone naming policy) indicates to use a resource identifier associated with switch resource 720 of the zone 750 when automatically creating a respective zone name. Format element %A (when included in a zone naming policy) indicates to use a resource identifier associated with storage array resource 730 of the zone 750 when automatically creating a respective zone name.

In one embodiment, format element %H identifies to create a zone name based on an object name of the host to which the first host port member of the zone belongs. Format element %S identifies to create a zone name based on an object name of a switch to which the first switch port member belongs. Format element %A identifies to create a zone name based on a name of a storage array to which the first storage port member belongs.

The following are examples of automatically generated zone names based on different types of zone naming formats associated with respective zone naming policies.

Suppose that zone naming policy 610 used to generate zone names 640 includes %H_%A (e.g., a combination of format elements %H and %A) as a zone naming format. In such a case, based on resource identifiers associated with resources in zone 750 as discussed above, zone name generator 630 generates the zone name "LOSAV128_SYMM239" for zone 750.

Qualifiers associated with the format elements can further define how to generate zone names. For example, b# (where # is an selected integer value) can be used to notify the zone name generator to limit a format element to use of a specified number of characters from the beginning of an object name. e# (where # is an selected integer value) can be used to notify the zone name generator to limit a format element to use of a specified number of characters from the end of an object name. Thus, %Hb3_%Ae3 would produce the zone name "LOS_239" for zone 705. Conversely, %He3_Ab3 would produce the zone name "128_SYM" for zone 705.

As another example, suppose that zone naming policy 610 used to generate zone names 640 includes %S_%A (e.g., a combination of format elements %S and %A) as a zone naming format. In such a case, based on resource identifiers associated with resources in zone 750 as discussed above, zone name generator 630 generates the zone name "SW34F2_SYMM239" for zone 750.

As another example, suppose that zone naming policy 610 used to generate zone names 640 includes %At (e.g., a combination of format element %A and qualifier t) as a zone naming format. Qualifier t identifies to tack on a time or date of creation associated with the zone name being created. In such a case, based on resource identifiers associated with resources in zone 750 as discussed above, zone name generator 630 generates the zone name "SYMM239__10.26.03" for zone 750 which reflects a creation date of Oct. 26, 2003. The time of day can be used as well in the zone name.

In one embodiment, a user 108 can include a custom string of text in a zone naming format for easy identification of a zone. For example, a zone naming policy 610 used to generate zone names 640 may include SWAT_%H_%Ap (e.g., a combination of text string SWAT, format elements %H and %A, and qualifier p) as a zone naming format. Quantifier p identifies to replace an object name with the name of a first port belonging to the respective resource associated with a format element. In this example, assume port 732 is named FA14b-0. In such a case, based on resource identifiers associated with resources in zone 750 as discussed above, zone name generator 630 generates the zone name "SWAT_SYMM239_FA14b-0" for zone 750.

Qualifier w can be used in lieu of qualifier p. In one embodiment, qualifier w identifies to replace an respective resource name as identified by a resource identified by the format element with the WWN (i.e., World Wide Name) of a first port belonging to the respective resource associated with the format element.

In one embodiment, zone names change automatically as ports are added to and removed from the new zone. As discussed, a zone name format can contain any characters allowed in zone names by the vendor of the switches in the fabric.

According to another embodiment, when a selected "Zoning Type" is WWN Zoning, one cannot include %S in the name format. When a selected "Zoning Type" is Port Zoning, one cannot include %H or %A in the zone name format. Typically, zone name formats include only letters, digits, and the percent (%), hyphen (-), dollar ($), underscore (_) and caret (^) characters. However, this can be expanded in other applications.

A zoning policy name format may be used to generate an invalid zone name under some circumstances, preventing user 108 from creating the zone. For example, if user 108 includes %S in a zone naming policy, and the switch to which the first switch port member belongs is identified only by its WWN, the zone name would begin with a number, which is not valid in one embodiment. User 108 might also include a character, such as the caret (^), which is not supported by all vendors, so the resulting name might be invalid depending on the vendor associated with the zone.

Functionality supported by computer system 110 according to embodiments of the invention will now be discussed with respect to flowchart 800 in FIG. 8 as discussed above with respect to FIGS. 1 through 7.

Figure 8:
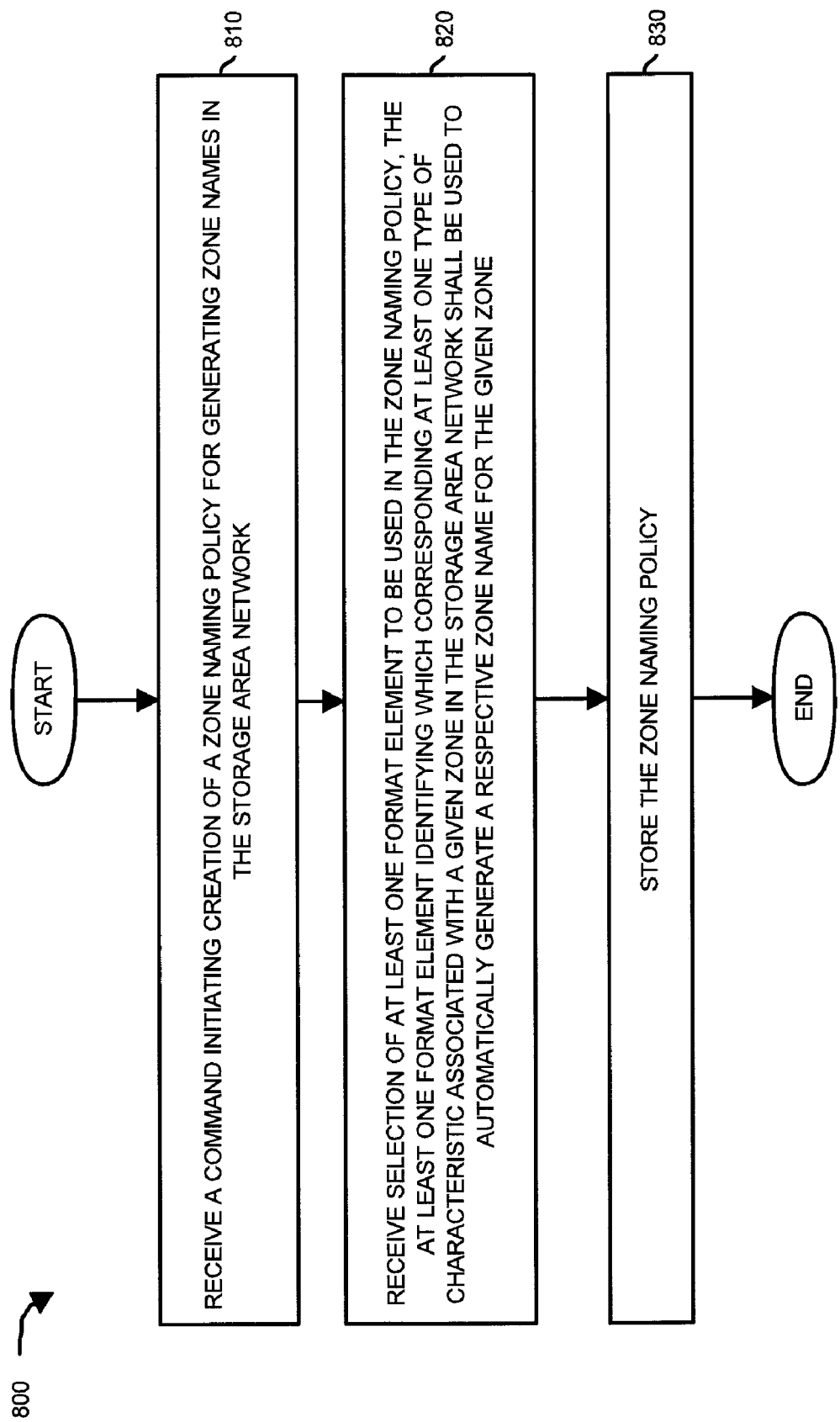
FIG. 8 is a diagram illustrating a general technique for creating a zone name policy according to an embodiment of the invention.

FIG. 8 is a flowchart 800 of processing steps performed by resource manager 120 according to an embodiment of the invention. In general, flowchart 800 illustrates how resource manager 120 enables user 108 of the management station computer system 110 to create one or more zone naming policies for automatically generating zone names associated network 100 and related peripheral equipment. Note that the discussion of FIG. 8 will include occasional references to techniques and features discussed in the previous figures.

In step 810, the resource manager 120 receives a command from user 120 initiating creation of a zone naming policy for generating zone names 640 in the network 100.

In step 820, the resource manager of computer system 110 receives selection of one or more format elements to be used in the zone naming policy 610. The one or more format elements 615 each identify which corresponding at least one type of characteristic associated with a given zone in the storage area network 100 shall be used to automatically generate a respective zone name for the given zone.

In step 830, the resource manager 120 of computer system 110 stores the zone naming policy 610 for later use. Accordingly, a network manager overseeing network 110, 300 can specify a format for creating zone names 640 based on a zone naming policy 640 reducing overall effort required to generate zone names.

Figure 9A:
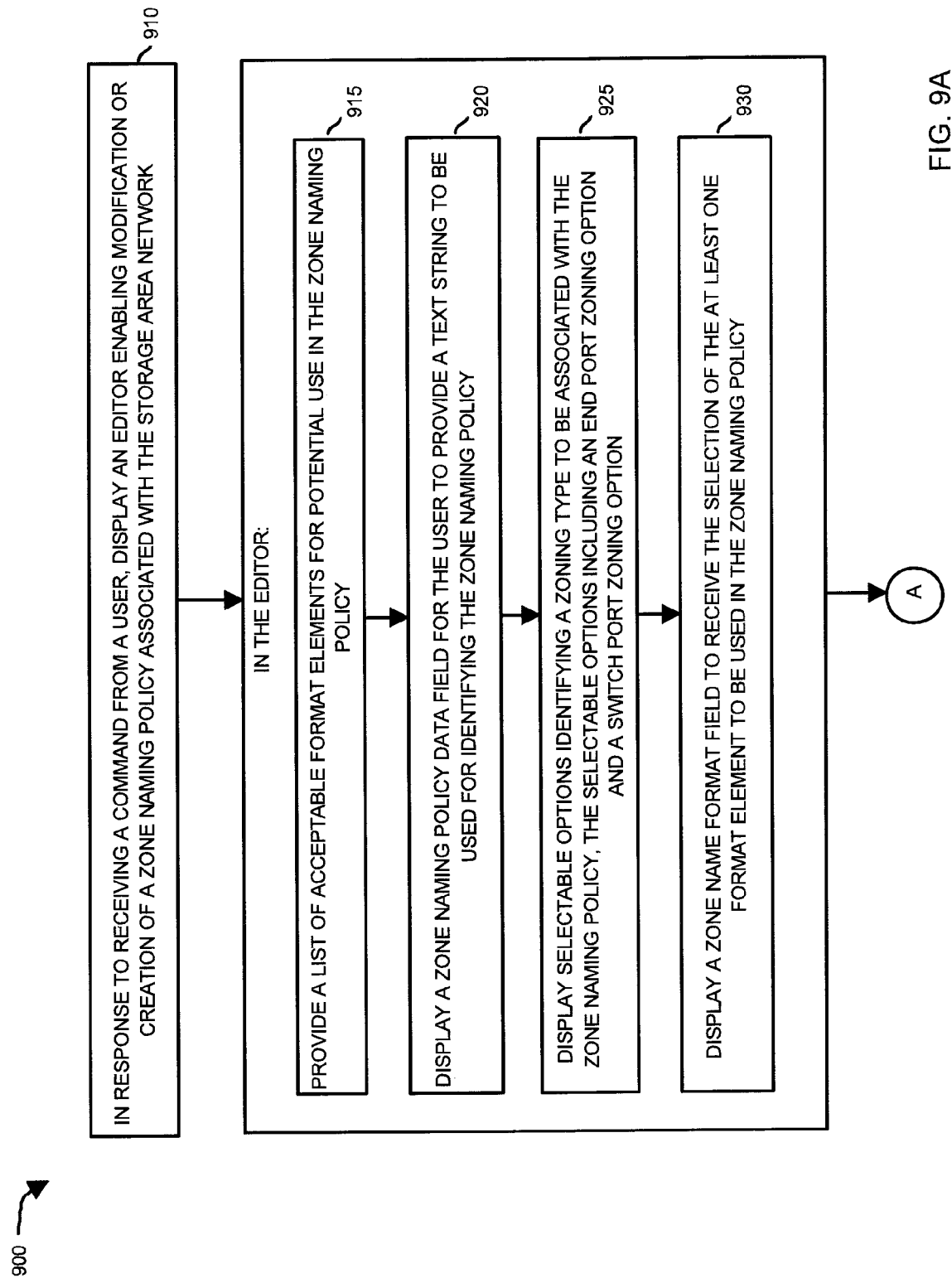
FIGS. 9A and 9B combine to form a flowchart illustrating a more detailed technique for creating one or more zone name policies according to an embodiment of the invention.
Figure 9B:
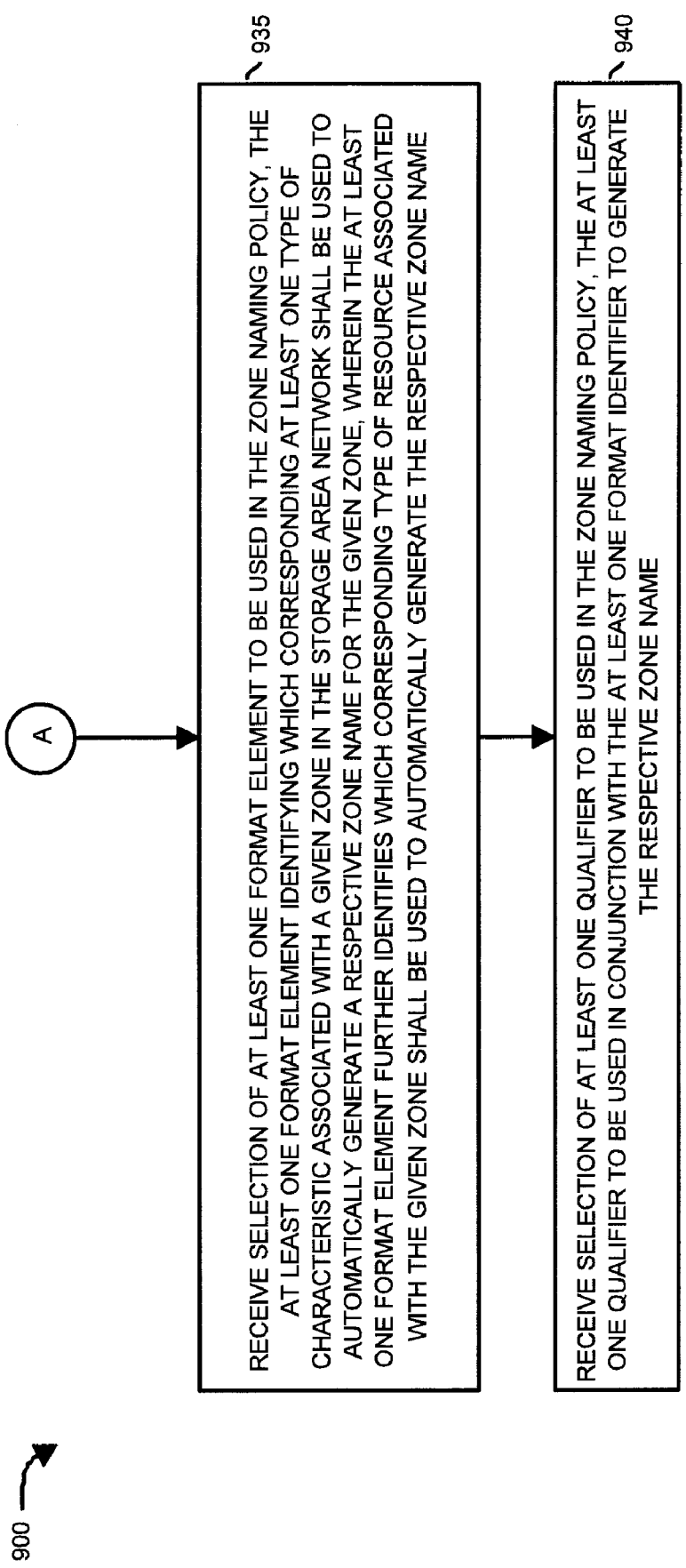

FIGS. 9A and 9B combine to form a flowchart 900 of processing steps performed by resource manager 120 according to an embodiment of the invention. Note that flowchart 900 more particularly illustrates a technique of creating or modifying a zone naming policy 610 (similar to that discussed in FIG. 8) according to an embodiment of the invention.

In step 910, in response to receiving a command from a user 108, the resource manager 120 displays an editor 505 enabling modification or creation of a zone naming policy 610 associated with the network 100.

In step 915, the resource manager 120 provides, in the editor 505, a list of acceptable format elements 615 for potential use in the zone naming policy.

In step 920, the resource manager 120 displays, in the editor 505, a zone naming policy data field 510 for the user 108 to provide a text string to be used for identifying the zone naming policy 610.

In step 925, the resource manager 120 displays, in the editor 505, selectable options identifying a zoning type to be associated with the zone naming policy 610. The selectable options include an end port zoning option and a switch port zoning option.

In step 930, the resource manager 120 displays, in the editor 505, a zone name format field 530 to receive the selection of the at least one format element 615 to be used in the zone naming policy 610.

In step 935, based on input to the editor 505 by the user 108, the resource manager 120 receives selection of one or more format elements to be used in the zone naming policy 610. The one or more format elements 615 identify which corresponding at least one type of characteristic associated with a given zone in the storage area network 100 shall be used to automatically generate a respective zone name for the given zone. In one embodiment, the one or more format elements further identify which corresponding type of resources (such as identifiers) associated with the given zone shall be used to automatically generate the respective zone name.

In step 940, the resource manager 120 receives selection of one or more qualifiers 620 to be used in the zone naming policy 610. As discussed, the one or more qualifiers are used in conjunction with the one or more format identifiers 615 to generate the respective zone name.

FIG. 10 is a flowchart 1000 of processing steps performed by resource manager 120 to automatically generate zone names according to an embodiment of the invention. Note that the discussion of FIG. 10 will include occasional references to techniques and features discussed in the previous figures.

In step 1010, the resource manager 120 retrieves a zone naming policy 610 to be used for generating a respective zone name of a given zone in the storage area network 100.

In step 1020, the resource manager 120 receives a selection of resources in the storage area network 100 that are associated with the given zone. For example, user 108 selects resources in the storage area network 100 that are to be associated with the given zone.

In step 1030, the resource manager 120 generates a respective zone name associated with the given zone based on characteristics associated with the resources as identified by the zone naming policy 610.

Figure 11:
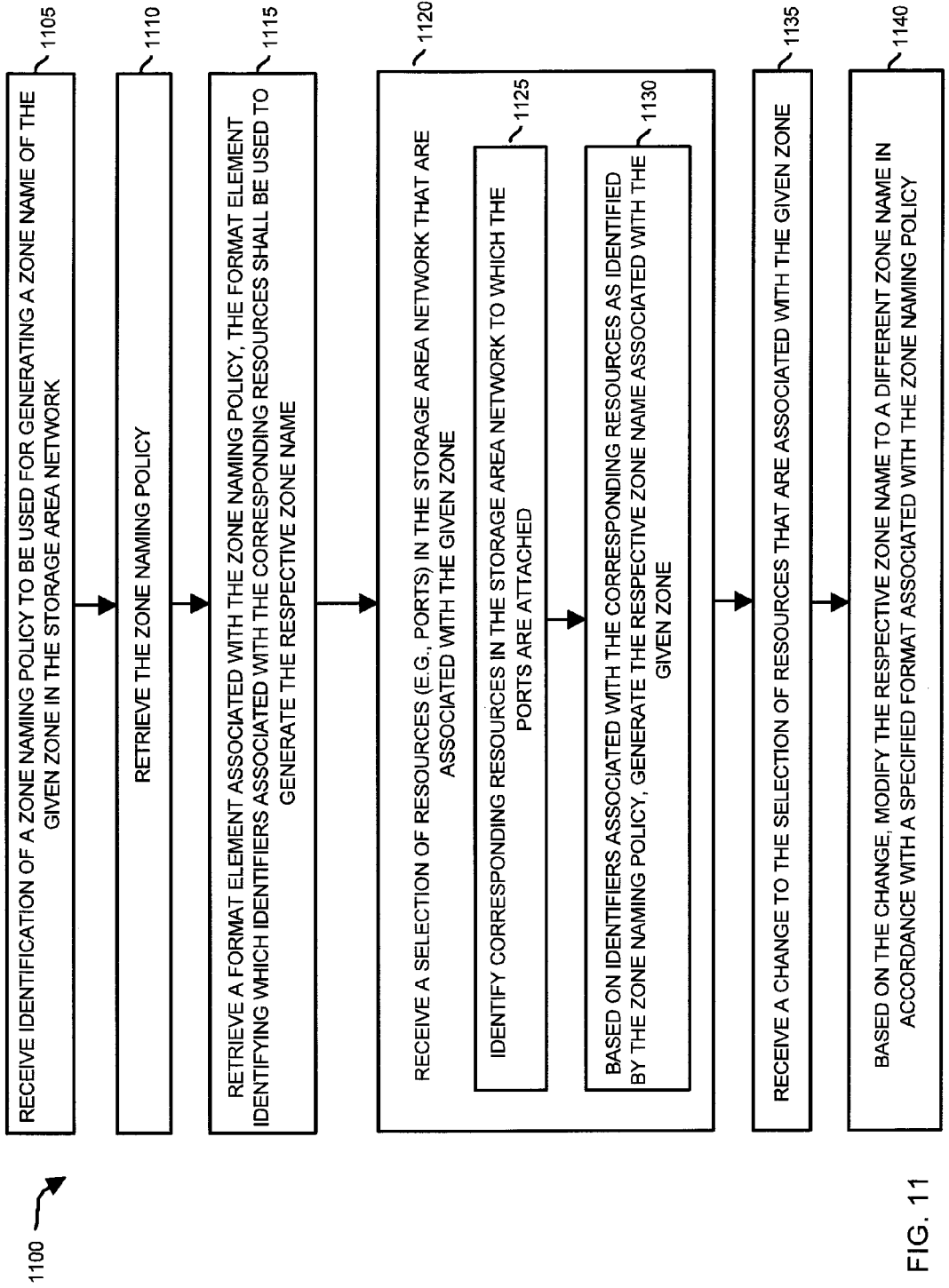
FIG. 11 is a flowchart illustrating a more detailed technique of utilizing a zone name policy to automatically generate zone names according to an embodiment of the invention.

FIG. 11 is a flowchart 1100 illustrating processing steps performed by resource manager 120 in accordance with a more specific example embodiment of the invention as discussed in FIG. 10. Thus, flowchart 1100 and its illustrative features may overlap with respect to FIG. 10 as well as other flowcharts discussed herein.

In step 1105, the resource manager 120 receives identification of a selected zone naming policy 610 to be used for generating a zone name in the storage area network 100.

In step 1110, the resource manager 120 retrieves the selected zone naming policy.

In step 1115, the resource manager 120 retrieves a format element 615 associated with the zone naming policy 610. The format element 615 identifies which identifiers associated with the corresponding resources in the zone shall be used to generate the respective zone name.

In step 1120, the resource manager 120 receives a selection of resources (e.g., ports) in the storage area network 100 that are associated with the given zone In sub-step 1125, the resource manager 120 identifies corresponding resources in the storage area network to which the ports are attached.

In step 1130, based on identifiers associated with the corresponding resources as identified by the zone naming policy, the resource manager 120 generates the respective zone name associated with the given zone.

In step 1135, the resource manager 120 receives a change to the selection of resources that are associated with the given zone.

In step 1140, based on the change, the resource manager 120 modifies the respective zone name to a different zone name in accordance with a specified format associated with the zone naming policy 610.

As discussed, techniques of the invention are well suited for use in applications in which a network manager manages a storage area network and wishes to create resource naming policies (e.g., zone naming policies, VSAN naming policies, etc.) associated with a storage area network. However, it should be noted that embodiments of the invention are not limited to use in such applications and that embodiments of the invention are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method comprising:
    receiving a command initiating creation of a zone name for a given zone in a storage area network;
    receiving names of resources that are associated with the given zone, the names of resources including a first resource name of a corresponding first resource in the given zone and a second resource name of a corresponding second resource in the given zone; and
    combining text characters of the first resource name with text characters of the second resource name to produce a zone name for the given zone in the storage area network.

2. The method as in claim 1 further comprising:
    receiving selection of a zone naming policy for generating the zone name associated with the given zone;
    retrieving zone format information associated with the zone naming policy, the zone format information indicating multiple types of resources; and
    utilizing the zone format information to identify resources in the given zone that are of a type as specified by the zone format information.

3. The method as in claim 2, wherein utilizing the zone format includes:
    identifying a first type of resource as specified by the zone format information;
    identifying a second type of resource as specified by the zone format information; and
    wherein receiving names of resources includes detecting that the first resource is of the first type as specified by the zone format information and that the second resource is of the second type as specified by the zone format information.

4. The method as in claim 3 further comprising:
    accessing the zone naming policy to retrieve qualifier information associated with zone format information; and
    utilizing the qualifier information to identify which portion of the text characters in the first resource name and which portion of the text characters in the second resource name to use when producing the zone name for the given zone.

5. The method as in claim 4, wherein combining text characters of the first resource name with text characters of the second resource name includes:
    creating a character string by appending the portion of the text characters in the first resource name to the portion of the text characters in the second resource name, the character string being the zone name produced for the given zone.

6. The method as in claim 1, wherein combining the text characters of the first resource name with text characters of the second resource name includes:
    creating the zone name to define a logical path through the first resource and the second resource in the storage area network, the logical path representing the given zone.

7. The method as in claim 6, wherein creating the zone name includes:
    identifying that the first resource and the second resource reside in the logical path through the storage area network;
    based on a zone naming policy: i) selecting a portion of the text characters in the first resource name, and ii) selecting a portion of the text characters in the second resource name; and
    appending the portion of the text characters in the first resource name and the portion of the text characters in the second resource name to create the zone name.

8. The method as in claim 1, wherein combining the text characters of the first resource name with text characters of the second resource name includes:
    creating the zone name to define a logical path through the first resource and the second resource of the storage area network, the logical path supporting communications between the first resource and the second resource.

9. The method as in claim 1 further comprising:
    receiving selection of ports of a switch in the storage area network that are associated with the given zone; and
    wherein receiving the names of resources is based on identifying that the first resource and the second resource are coupled to communicate with each other through the ports.

10. The method as in claim 9, wherein the first resource is a host of the storage area network and the second resource is a storage resource of the storage area network.

11. A computer system associated with a storage area network, the computer system comprising:
    a processor;
    a memory unit that stores instructions associated with an application executed by the processor; and
    an interconnect coupling the processor and the memory unit, enabling the computer system to execute the application and perform operations of:
        receiving a command initiating creation of a zone name for a given zone in a storage area network;
        receiving names of resources that are associated with the given zone, the names of resources including a first resource name of a corresponding first resource in the given zone and a second resource name of a corresponding second resource in the given zone; and
        combining text characters of the first resource name with text characters of the second resource name to produce a zone name for the given zone in the storage area network.

12. The computer system as in claim 11 further supporting operations of:
    receiving selection of a zone naming policy for generating the zone name associated with the given zone;
    retrieving zone format information associated with the zone naming policy, the zone format information indicating multiple types of resources; and
    utilizing the zone format information to identify resources in the given zone that are of a type as specified by the zone format information.

13. The computer system as in claim 12 further supporting operations of:
    identifying a first type of resource as specified by the zone format information;
    identifying a second type of resource as specified by the zone format information; and wherein receiving names of resources includes detecting that the first resource is of the first type as specified by the zone format information and that the second resource is of the second type as specified by the zone format information.

14. The computer system as in claim 13 further supporting operations of:
   accessing the zone naming policy to retrieve qualifier information associated with zone format information; and
   utilizing the qualifier information to identify which portion of the text characters in the first resource name and which portion of the text characters in the second resource name to use when producing the zone name.

15. The computer system as in claim 14, wherein combining text characters of the first resource name with text characters of the second resource name includes:
   creating a character string by appending the portion of the text characters in the first resource name to the portion of the text characters in the second resource name, the character string being the zone name produced for the given zone.

* * * * *